United States Patent Office 2,965,563
Patented Dec. 20, 1960

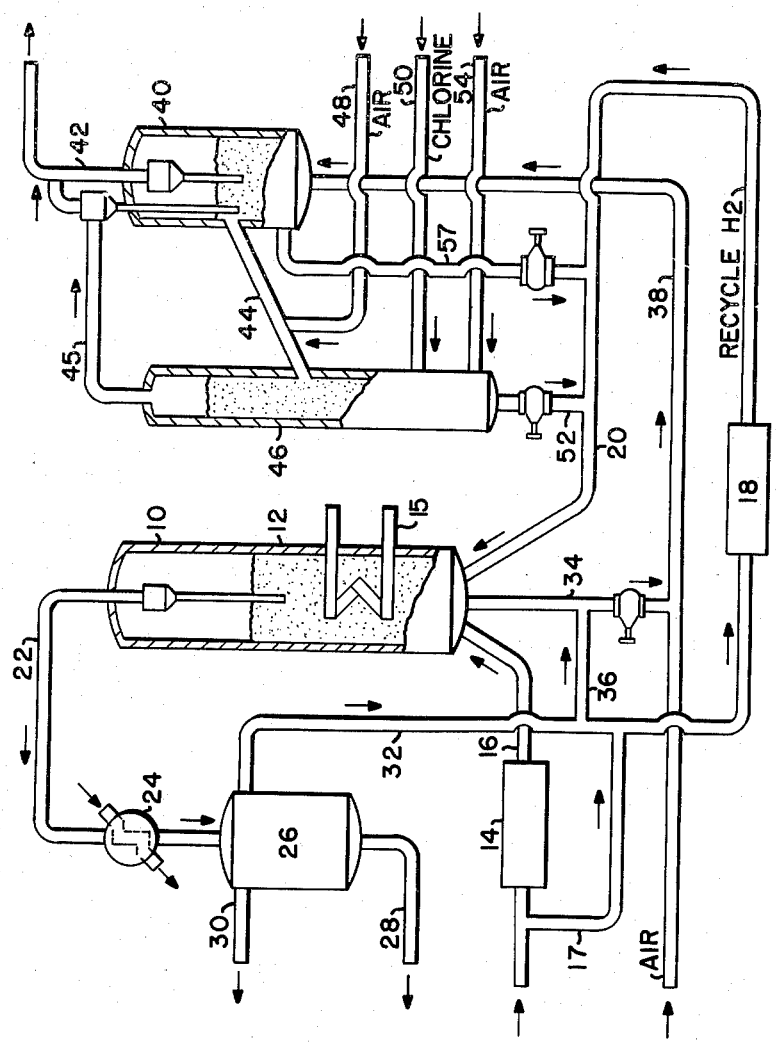

2,965,563

HYDROFORMING AND REGENERATION AND REACTIVATION OF PLATINUM CATALYST WITH CHLORINE GAS UNDER ANHYDROUS CONDITIONS

Frederick W. Steffgen, Brea, Calif., and Charles Newton Kimberlin, Jr., and Fred J. Buchmann, Baton Rouge, La., assignors to Esso Research and Engineering Company, a corporation of Delaware Filed Mar. 23, 1959, Ser. No. 801,257

5 Claims. (Cl. 208—140)

The present invention relates to improvements in the hydroforming of hydrocarbons, and in particular, relates to hydroforming carried out in the presence of a bed of platinum group metal catalyst at relatively low pressures and relatively low amounts of hydrogen or in the complete absence of added hydrogen.

Hydroforming is an operation in which a naphtha which may be a virgin naphtha, a cracked naphtha, or a Fischer Synthesis naphtha, is contacted at elevated temperatures and pressures in the presence of hydrogen with a solid catalytic material. The process is operated under conditions which do not consume hydrogen, and in fact, there is invariably a net production of hydrogen. For best results, the naphtha to be hydroformed should contain a substantial amount of naphthenic hydrocarbons which undergo conversions by dehydrogenation to the corresponding aromatic as where, for example, methylcyclohexane is dehydrogenated to form toluene. However, in addition to the denydrogenation of naphthenes other reactions occur and these include hydrocracking of paraffins, isomerization of straight chain paraffins to form branch chain paraffins, dehydrocyclization of paraffins, such as normal heptane to form aromatics such as toluene plus hydrogen, and isomerization of compounds such as ethylcyclopentane to form methylcyclohexane. In addition to these hydrocarbon reactions, the sulfur compounds present are decomposed with the elimination of sulfur as hydrogen sulfide. Thus, hydroforming is a desulfurizing process as well as a means of increasing the octane number of naphtha feeeds.

The catalysts commonly employed in this operation are those which possess hydrogenation-dehydrogenation activity. Thus, platinum or palladium carried on a spacing agent, such as an active form of alumina, have been proposed as catalysts in this hydroforming process. However, certain oxides of the IV, V and VI groups of the periodic system carried on a suitable support have also been proposed and used in hydroforming naphthas. Probably, the best hydroforming catalyst among the metal oixdes is molybdenum oxide, and a good catalyst is one which contains, say, 10 weight percent of molybdenum oxide on an active form of alumina. Chromium oxide, however, carried on alumina forms a good aromatization catalyst, that is, a catalyst adapted to promote ring closures as where normal heptane is cyclicized to form methylcyclohexane, which can then be dehydrogenated to form toluene. Ordinarily, the aromatization process is conducted at about atmospheric pressure in the presence of added hydrogen.

In the prior art two rather distinct hydroforming processes employing a platinum catalyst have been developed, viz., (1) a continuous, non-regenerative process in which naphtha feed and hydrogen are passed uninterruptedly over the catalyst at hydroforming conditions throughout the life of the catalyst extending over a period of several months, and (2) a regenerative process in which the flow of feed and hydrogen is infrequently interrupted to permit regeneration of the catalyst by burning off of coke deposits by air. In the non-regenerative process, it is necessary to avoid hydroforming conditions which cause deactivation of the catalyst by coke deposits or otherwise. For this reason it is necessary to conduct the hydroforming operations at relatively high pressures above about 400 p.s.i.g., usually 400 to 750 p.s.i.g., and with high rates of recycle of hydrogen to the reactor, usually about 5000 to 7500 s.c.f. of recycle hyrogen per barrel of naphtha feed. Under these conditions the catalyst is relatively less active for promoting dehydrogenation reactions and relatively more active for hydrocracking than would be the case at lower pressures and at lower recycle hydrogen rates, so that a lower feed rate is required for a given octane number improvement of the feed and the hydroformed product has a higher volatility and is produced in a somewhat lower yield for a given octane number improvement than would be the case under more favorable operating conditions. Furthermore, the "octane number ceiling," that is to say, the maximum octane number of the hydroformed product that is compatible with long catalyst life, is relatively low for the non-regenerative process. This "octane number ceiling" depends somewhat upon the feed stock quality and the specific operating conditions, but is usually in the order of 90 Research octane number for a six months catalyst life. The non-regenerative process is further limited in the quality of feed stocks that may be processed; these must be low in sulfur content, below about 0.01 weight percent, and should be relatively low boiling and free of heavy ends, with end points below about 320° F. The prior art regenerative platinum hydroforming process was developed to overcome some of the limitations of the non-regenerative process and is an improvement over the latter process. In the regenerative process provision is made for the infrequent regeneration of the catalyst by burning coke deposits therefrom with air. However, the number of regenerations during the course of the catalyst's life must be severely limited, since after each successive regeneration the catalyst is somewhat less active than after the preceding regeneration. Similarly, each successive process period is shorter than that preceding; thus, for example, the first process period with fresh catalyst may last for 800 hours, the second process period after one regeneration may last for 700 hours, the third process period after two regenerations may last for 600 hours, and so on. This progressive deactivation of the catalyst with successive regenerations is believed due to a growth in the crystal size of the patinum on the catalyst. This growth in crystal size, which is detectable by X-ray diffraction, is irreversible under the ordinary conditions of hydroforming and regeneration. The occasional regeneration of the catalyst permits the operation of the regenerative process under severer and more favorable conditions than is possible with the non-regenerative process. However, the process is still limited by the necessity of restricting the number of regenerations. Thus, in the regenerative process, it is necessary to conduct the operation at pressures above about 200 p.s.i.g., usually 200 to 350 p.s.i.g., and at relatively high hydrogen recycle rates, usually about 4000 to 6000 s.c.f. of recycled hydrogen per barrel of naphtha feed. Under these somewhat more favorable conditions, catalyst dehydrogenation activity is higher and catalyst hydrocracking activity is lower so that for a given octane number product, a somewhat higher feed rate may be employed and there is obtained a somewhat greater yield of product having a lower volatility. The "octane number ceiling" of the regenerative process is also higher, on the average about 96 Research octane number product for a six months catalyst life. The regenerative process is also somewhat less critical of feed stock quality. Naphthas containing up to about 0.03% sulfur may be processed without prior desulfurization. Both the prior art regenerative and non-regenerative processes employ a fixed bed of catalyst; due to the infrequency or even total absence of catalyst regeneration, a fluid catalyst bed type of operation can offer only relatively minor advantages for processes of this type. The object of the present invention is to provide an improved process for hydroforming naphthas in the presence of air regenerable platinum catalyst.

Another object of the present invention is to provide improved means for regenerating the platinum catalyst which has become deactivated during the onstream phase.

Another object of the present invention is to conduct the hydroforming operation under conditions which will give increased yield of high quality product.

Another object of the present invention is to provide a platinum containing catalyst, which not only has good hydrogenation-dehydrogenation activity, but also possesses controlled hydrocracking activity so that a hydroformate product may be formed which possesses the desired volatility characteristics.

Other objects of the present invention will appear from the following description and claims.

In brief compass, the present invention involves a regenerative process for hydroforming naphthas in the presence of a bed of catalyst containing a platinum group metal, preferably, platinum. In this operation, the pressure is maintained at a relatively low value and the so-called recycle gas rates are relatively low. In other words, whereas, in the conventional hydroforming operation using platinum, the pressures in the reaction zone are maintained in the range of up to about 750 p.s.i.g., the present invention contemplates operating at pressures below 400 p.s.i.g., preferably of the order of 0 to 350 p.s.i.g. And, whereas, in the prior practice the recycle gas rates are of the order of 4000–7500 cubic feet of hydrogen, the present invention contemplates utilizing about 50 to 6000 cubic feet recycle hydrogen gas to the hydroforming zone per barrel of oil fed thereto. It is also an important feature of the present invention to provide a reactivation means for restoring the activity of the catalyst which has become deactivated during use in the hydroforming phase, and this involves treating the catalyst with air admixed with chlorine after burning coke or carbonaceous deposits therefrom and stripping water from the catalyst with dry air or a dry inert gas such as nitrogen or flue gas.

In the accompanying drawing, there is illustrated, diagrammatically, an apparatus layout in which one modification of the present invention may be carried into effect. It will be understood that while a fluidized solids operation is illustrated, fixed or moving bed operations are also within the scope of this invention. At pressures below about 200 p.s.i.g., fluidized solids operation is preferred in view of the rapidity with which the catalyst loses activity.

Similar reference characters refer to similar parts or materials.

Referring in detail to the drawing, 10 represents a reactor vessel containing a fluidized bed 12 of catalyst comprising 0.01 to 1.0 wt. percent platinum and/or 0.1 to 2.0 wt. percent palladium. A preferred catalyst comprises about 0.1 to 0.6 wt. percent platinum widely dispersed on a high surface area alumina support, having a surface area of about 150 to 220 square meters per gram. The pressure in vessel 10 may be in the range of 0 to 200 p.s.i.g., and is preferably about 50 p.s.i.g. The temperature of catalyst bed 12 may be in the range of about 800° to 975° F.; however, under the conditions of low pressure and low recycle hydrogen rates of the present invention, the dehydrogenation activity of platinum metal catalysts is extremely high, so that the reaction temperature may be somewhat lower than that of the prior art hydroforming processes. A preferred temperature is in the range of 875° to 910° F. Naphtha feed, which need not be especially fractionated or otherwise prepurified, is preheated in heater 14 and passed by line 16 into the lower section of reactor 10. The present process is not particularly critical of the quality of the naphtha feed; the feed may have a final boiling point as high as about 400° F. and may contain relatively large amounts of sulfur, up to about 0.2 wt. percent. The naphtha feed is preheated in heater 14 to a temperature in the range of 900° to 1050° F., preferably about 975° to 1000° F. Recycled hydrogen, which has been preheated to 900° to 1300° F., preferably about 1200° F., in heater 18 and which bears freshly regenerated and reactivated catalyst from lines 52 and 57, is also introduced into the lower section of reactor 10 by line 20. Alternatively, in place of separately preheating the naphtha feed and recycle hydrogen streams, the naphtha feed from line 17 may be mixed with the recycle gas in line 32, and the combined stream preheated in heater 18; in this case the preferred preheat temperature is in the range of 900° to 1000° F. The recycle gas, or recycle hydrogen, normally contains about 65 to 90 mol percent hydrogen with the remainder being light hydrocarbon gases; the exact composition of the recycle gas depends upon the hydroforming conditions maintained in reactor 10 and upon the pressure and temperature at which the gas is separated from the liquid products. The amount of recycle gas employed may be in the range of about 50 to 2000, preferably about 100 to 1000 standard cubic feet per barrel of naphtha feed (s.c.f./b.). However, if desired, the recycle gas may be omitted entirely. In addition to preheating the feed and recycle gas the additional heat load required by the endothermic hydroforming reaction may be supplied to catalyst bed 12 by heating coil 15 immersed therein. Hot flue gases or the like may be passed through coil 15. Other means of supplying heat to catalyst bed 12, for example, by circulating a stream of catalyst through coils in a furnace, are within the scope of the invention. The naphtha vapor and recycled gas pass upwardly through catalyst bed 12 whereupon the naphtha is hydroformed. After leaving catalyst bed 12 the hydroformed vapor and gas is passed through conventional catalyst recovery equipment, such as a cyclone separator or filter, or the like, and through line 22 and condenser or cooler 24 into gas-liquid separator 26. The hydroformed naphtha product is removed from the system by line 28. The excess gaseous product is removed from the system by line 30 and the remainder of the gas is recycled by line 32. When feeding a high sulfur content naphtha, above about 0.02 wt. percent sulfur, it is preferred to remove the hydrogen sulfide from the recycle gas in line 32 by means of a caustic scrubber or other conventional scrubbing means not shown. Catalyst from bed 12 passed into standpipe 34 where it is stripped of adsorbed hydrocarbons by hydrogen from line 36. Stripped catalyst from standpipe 34 passes into line 38 where it is picked up by a stream of air and transported to regenerator 40. Regenerator 40, which is a relatively small vessel because of the low rate of coke formation on platinum and palladium catalysts, is maintained at a temperature of 900° to 1200° F., preferably, 1000° to 1100° F. The pressure in regenerator 40 is approximately the same as that in reactor 10. In vessel 40 coke deposits are burned from the catalyst by air introduced by line 38. In the burning of the coke a certain amount of water is formed by combustion of the hydrogen in the coke; this is stripped from the catalyst and passes overhead with the flue gases through conventional catalyst recovery means, such as a cyclone separator or filter, or the like, and is removed from the system by line 42. Since for the subsequent chlorine reactivation, presently to be described, a completely regenerated or coke-free catalyst is desired, it is preferred to employ an excess of air in regenerator 40; the oxygen content of the flue gas in line 42 should be above 2%, and is preferably above 5%. Regenerated catalyst passes by line 44 into the upper section of chlorine reactivator vessel 46. Since it is desired to maintain substantially anhydrous conditions in reactivator vessel 46, water vapor is further stripped from the catalyst passing through line 44 by means of air introduced by line 48. Reactivator vessel 46, which may be comparatively small in cross-sectional area compared to its height, is preferably maintained at the same pressure and temperature as regenerator 40. Chlorine gas or a mixture of chlorine gas in air is introduced into vessel 46 near the mid-section thereof by line 50 and air is introduced into vessel 46 near the bottom thereof by line 54. The air and chlorine pass upwardly through vessel 46 and are removed from the system by line 45, while catalyst from line 44 passes downwardly through vessel 46. Thus, the upper section of reactivator vessel comprises a chlorine treating zone wherein regenerated (i.e., coke-free) catalyst is contacted with a mixture of chlorine gas and air, and the lower section of reactivator vessel 46 comprises a stripping zone wherein adhering chlorine is stripped from the treated catalyst by means of air. In the upper, chlorine treating zone of vessel 46 the chlorine partial pressure may be in the range of about 0.001 to 2 atmospheres, preferably, about 0.01 to 1 atmosphere. The quantity of chlorine admitted to vessel 46 by line 50 may be in the range of 0.1 to 2.0 wt. percent, preferably, about 0.5 wt. percent, of the catalyst introduced into vessel 46 by line 44. As mentioned above the temperature and total (air plus chlorine) pressure in the chlorine treating zone is preferably about the same as the temperature and pressure in regenerator vessel 40. The residence time of the catalyst in the chlorine treating may be in the range of 15 seconds to 1 hour, preferably about 1 to 15 minutes. The action of the chlorine treatment on the catalyst is to destroy large platinum crystals and re-disperse the metal over the catalyst surface, thus completely restoring the activity of the catalyst to that of fresh catalyst.

As the chlorine treated catalyst descends from the upper chlorine treating zone of vessel 46 into the lower stripping zone of vessel 46, adhering chlorine is stripped from the catalyst by air from line 54. However, it is usually preferred not to completely strip the chlorine from the catalyst and the operation of the stripping zone, in conjunction with that of the chlorine treating zone, provides an important means for controlling the hydrocracking activity of the catalyst, and hence, of controlling the volatility of the hydroformed naphtha product at the desired level. Apart from the temperature and pressure in vessel 46, which are generally fixed by those in vessel 40, the quantity of chlorine remaining on the stripped catalyst may be controlled by the amount of air introduced into the stripping zone by line 54 and the partial pressure of the chlorine employed in the chlorine treating zone; the lower the amount of stripping air employed the higher the partial pressure of chlorine in the treating zone, the greater the amount of chlorine remaining on the stripped catalyst and the higher the hydrocracking activity of the catalyst, and hence, the higher the volatility of the hydroformed naphtha product. In general, the total amount of chlorine (i.e., both chemically combined and adsorbed chlorine) remaining on the stripped catalyst may be in the range of about 0.2 to 1.25 wt. percent, and is preferably about 0.5 to 1.0 wt. percent. The reactivated and stripped catalyst passes from vessel 46 by line 52 into line 20 where it is picked up by recycle gas or by a mixture of recycle gas and naphtha feed and transported to reactor vessel 10 as hereinbefore set forth. If desired, all of the catalyst leaving regenerator vessel 40 may be reactivated by chlorine treatment in vessel 46 before re-introducing it into reactor vessel 10 as described above; however, it is generally preferred to reactivate only a portion, for example, one-tenth to one-half of the catalyst from regenerator 40, in which case the remainder of the catalyst flows directly from regenerator 40 by lines 57 and 20 into reactor vessel 10.

In order more fully to explain and describe the present invention, the following specific example is set forth.

EXAMPLE

A naphtha having the following inspection was hydroformed according to the present invention:

Feed inspection

| | |
|---|---|
| Gravity | ° API__ 54.5 |
| Boiling range | ° F__ 200–330 |
| Naphthenes, weight percent | 41 |
| Paraffins, weight percent | 43 |
| Aromatics, weight percent | 16 |
| Weight percent sulfur | 0.004 |
| CFRR octane number | 57.5 |

Conditions in hydroforming zone

| | |
|---|---|
| Catalyst composition | 0.6% platinum on alumina. |
| Temperature | 900° F. |
| Pressure | 50 p.s.i.g. |
| W./hr./w | 4.0. |
| Cubic feet of recycle gas containing hydrogen feed to the hydroforming zone per barrel of oil fed to the hydroforming zone | 200. |
| Concentration of hydrogen in recycle gas | About 80%. |
| Length of hydroforming phase per cycle in hours | 1.0. |

Conditions in the regenerator

| | |
|---|---|
| Temperature | 1050° F. |
| Pressure | 50 p.s.i.g. |
| Residence time | 10 minutes. |
| Weight percent carbon on regenerated catalyst | Less than 0.1%. |
| Weight percent sulfur on regenerated catalyst | Less than 0.1%. |

Conditions in chlorine treater

| | |
|---|---|
| Temperature | 1050° F. |
| Pressure | 50 p.s.i.g. |
| Residence time | 5 minutes. |
| Composition of treating gas | 4% chlorine in air. |
| Chlorine partial pressure | 0.175 atmosphere. |
| Duration of air treat following chlorine treat | 5 minutes. |
| Wt. percent chlorine on stripped catalyst | About 0.7. |

Product inspection

| | |
|---|---|
| Gravity | 43.7° API. |
| Boiling range | $C_5$ to 350° F. |
| CFRR octane number | 96. |

It will be understood, of course, that the foregoing example is merely illustrative of the invention and that the same is not limited to the precise details set forth in the foregoing example. In other words, the temperature in the hydroforming zone may vary from 800° to 975° F., the pressure may vary from 0 to 400 p.s.i.g., the length of each productive phase of the complete process cycle, including regeneration and chlorine treatment may vary from 1 to 20 hours. The catalyst composition may vary from one containing .01% of platinum to one containing 1% by weight of platinum, the remainder being a suitable support. Furthermore, palladium may be used in place of platinum as the active hydrogenation-dehydragenation component of the catalyst, but palladium must be used in about three times the amount of platinum for similar results. As to the treatment of regenerated catalyst with chlorine, it is pointed out that the amount of chlorine in the treating gas may vary from a chlorine partial pressure of about 0.001 atmosphere to a chlorine partial pressure of about 2 atmospheres, and that it will not be necessary to treat the catalyst during every cycle. An examination of the regenerated catalyst periodically to determine average platinum crystallite size, will determine whether or not it is necessary to increase the proportion of the catalyst being treated with the chlorine-containing gas. If the average crystallite size is above about 150 A. units as determined by X-ray examination, then the proportion of the catalyst flowing through the chlorine treatment zone described above should be increased and the proportion of catalyst by-passing the zone should be decreased. It is important to note in connection with the chlorine treatment that the catalyst should be substantially free of water. In other words, the catalyst should be substantially free of water when subjected to chlorine treatment for best results.

To recapitulate briefly, the present invention relates to improvements in hydroforming naphthas in the presence of a platinum group metal. The present improvements comprise employing a platinum-alumina catalyst in a hydroforming process operated at relatively low pressures, low hydrogen recycle rates and short time on-stream periods. It has been discovered that the catalyst which is fouled during the on-stream phase cannot successfully be regenerated with air alone, nor can it be satisfactorily reactivated by subjecting the catalyst to a prolonged soaking in air at elevated temperatures and pressures, following the removal of deactivating carbonaceous deposits by oxidative regeneration. It has been discovered, however, that the spent catalyst may be restored to a high level of activity by subjecting it first to oxidative regeneration and then subjecting it to the influence of a chlorine-containing gas for a short period of time. The chlorine treatment of the regenerated catalyst need not be performed during each cycle. It is apparently required when the platinum group metal particles are formed into large crystals as a result of use in the process. Furthermore, since addition of chlorine to the catalyst increases its hydrocracking activity and the volatility of the product, means are provided for controlling the product volatility to the desired level by control of the amount of chlorine remaining on the catalyst after treatment with chlorine and stripping with air. During the processing, however, chlorine may be driven off possibly by the action of water either in the feed or formed during the process or during the regeneration of the catalyst. In any event, the results of tests clearly dictate that the air regenerable platinum catalyst must be at least intermittently treated with the chlorine-containing gas following regeneration in order to maintain the activity and selectivity of the said catalyst at a high level.

This application is a continuation-in-part of application Serial No. 453,456, filed September 1, 1954, now abandoned, by Frederick W. Steffgen, Charles N. Kimberlin, Jr., and Fred J. Buchmann.

Numerous modifications of the present invention may be made by those who are familiar with this art without departing from the spirit thereof.

What is claimed is:

1. The method of hydroforming naphthas which consists essentially of contacting naphtha vapors in admixture with from 50 to 6000 cu. ft. of hydrogen-rich gas per barrel of naphtha feed with a platinum on alumina catalyst of temperatures in the range of 800°–975° F. and at a pressure of from 0 to 400 p.s.i.g. for a period sufficient to effect the desired conversion, periodically reactivating said catalyst to maintain an average metal crystal size below about 150 A. units by discontinuing contact of the naphtha feed vapors and hydrogen-rich gas with the deactivated catalyst, contacting said deactivated catalyst with a free oxygen-containing gas at a temperature in the range of 900° to 1200° F. to remove carbonaceous deposits, stripping the catalyst so treated with a dry gas to remove water, then contacting the stripped catalyst under anhydrous conditions with a free chlorine-containing gas at chlorine partial pressure in the range of 0.001 to 2 atmospheres, partially stripping the chlorine treated catalyst to reduce the amount of chlorine thereon to within the range of 0.2 to 1.25 wt. percent and resuming contact of the naphtha feed vapors and hydrogen-rich gas with the chlorine-containing catalyst so obtained under the aforesaid conditions of temperature and pressure to effect the desired conversion of the naphtha.

2. The method of claim 1 wherein said free chlorine-containing gas is a mixture of chlorine and air.

3. A continuous method of hydroforming naphthas which comprises providing a fluidized bed of finely divided platinum catalyst in a hydroforming zone, charging naphtha to said hydroforming zone, charging a free hydrogen-containing gas to said zone, maintaining a temperature in the range of 800° to 975° F., and a pressure in the range of 0 to 200 p.s.i. in said hydroforming zone, controlling the amount of hydrogen fed to said hydroforming zone within the range of 50 to 2000 standard cubic feet of hydrogen per barrel of oil fed to said hydroforming zone, permitting the naphtha to remain resident in said hydroforming zone for a sufficient period of time to effect the desired hydroforming reaction, maintaining the catalyst in an active state for an extended period of time by withdrawing catalyst from said reaction zone and treating the catalyst in a regeneration zone with a free oxygen-containing gas to remove carbonaceous and other deposits therefrom, thereafter treating said catalyst with a free chlorine-containing gas, under anhydrous conditions, returning the thus treated catalyst to the hydroforming zone and recovering a hydroformed product from said hydroforming zone.

4. The method set forth in claim 3 wherein said catalyst following the chlorine treatment is treated with a stripping gas to remove a portion of the chlorine associated with said catalyst.

5. The method set forth in claim 3 wherein the regenerated chlorine treated catalyst is returned to the reaction zone containing about 0.2–1.25 wt. percent chlorine.

References Cited in the file of this patent

UNITED STATES PATENTS 2,746,909    Hemminger            May 22, 1956